United States Patent [19]
Li

[11] Patent Number: 5,955,989
[45] Date of Patent: Sep. 21, 1999

[54] OPTIMUM EDGES FOR SPEAKERS AND MUSICAL INSTRUMENTS

[76] Inventor: Ming-Chiang Li, 11415 Bayard Dr., Mitchellville, Md. 20721

[21] Appl. No.: 08/772,629

[22] Filed: Dec. 23, 1996

[51] Int. Cl.$^6$ ........................................................ H01Q 3/22
[52] U.S. Cl. .............................. 342/368; 342/58; 342/125
[58] Field of Search .................................... 342/368, 375, 342/372, 373, 374, 58, 125, 357.01, 357.06

[56] References Cited

U.S. PATENT DOCUMENTS

| | | | |
|---|---|---|---|
| 4,695,750 | 9/1987 | Mathis | 324/77 K |
| 4,814,773 | 3/1989 | Wechsberg et al. | 342/368 |
| 4,814,774 | 3/1989 | Herczfeld | 342/372 |
| 5,294,930 | 3/1994 | Li | 342/13 |
| 5,333,000 | 7/1994 | Hietala et al. | 342/368 |
| 5,374,935 | 12/1994 | Forrest | 342/368 |
| 5,818,386 | 10/1998 | Belisle | 342/372 |

*Primary Examiner*—Thomas H. Tarcza
*Assistant Examiner*—Dao L. Phan

[57] ABSTRACT

A descriptor has the capabilities of providing state vectors to describe movable platforms, extended objects, information collecting and surveillance systems. An aggregator furnishes the descriptor with abilities to deliver the state vectors in dynamical situations of instabilities and chaos. The former comprises navigation antennas, optical RF link systems, and processing center for delivering the state vectors from received navigation RF signals. The latter comprises an RF delay loop for aggregating a train of RF signals into a single RF pulsed signal and means for outputting the pulsed signal for analysis. The aggregator has many applications. For instance, an aggregator is able to unscramble pseudo random signals with partial codes and to enhance the statistics of weak transient signals.

20 Claims, 10 Drawing Sheets

OPTIMUM EDGES FOR SPEAKERS AND MUSICAL INSTRUMENTS

CROSS REFERENCES

This application is related to:

U.S. Pat. No. 5,294,930 and reissue application Ser. No. 08/375,654 of Optical RF Stereo;

U.S. Pat. No. 5,296,860 and reissue application Ser. No. 08/524,211 of Optical Fiber Based Bistatic Radar;

U.S. Pat. No. 5,298,911 of Serrated-Roll Edge for Microwave Antennas;

Application Ser. No. 08/212,385 of Optical RF Support Network, Group Art Unit: 2201, Filing Date: Mar. 14, 1994;

Application Ser. No. 08/185,177 of RF Signal Train Generator and Interferoceivers, Group Art Unit: 2202, Filing Date: Jan. 24, 1994;

Application Ser. No. 08/352,190 of Different Models for RF Signal Train Generators and Interferoceivers, Group Art Unit: 2201, Filing Date: Dec. 1, 1994;

Application Ser. No. 08/439,284 of Optical Fiber Based Radars, Group Art Unit: 2201, Filing Date: May 11, 1995, and Continuation of application Ser. No. 08/018,388, Filing Date: Feb. 17, 1993;

Application Ser. No. 08/106,541 of Optical Fiber Based Radars, Group Art Unit: 2101, Filing Date: Aug. 16, 1993, and Continuation-In-Part of application Ser. No. 07/612,997 of Optimum Edges For Acoustical Antennas,, Filing Date: Nov. 15, 1990.

TECHNICAL FIELD OF INVENTION

The present inventions are on descriptors and aggregators. The descriptors provide state vectors for radars, sonars, stereo systems, phased arrays, sensors, cameras, antennas, platforms, extended objects, and so on. The purposes of the descriptors are to enhance the performances of RF, acoustical, and surveillance systems, to determine the attitudes of platforms in precision, to monitor the mechanical structures or movements of extended objects. The aggregators provide the descriptors with the abilities to deliver the state vectors in dynamical situations of instabilities and chaos. Furthermore, present inventions advance the arts of the parent inventions on the acoustical antennas, optical fiber based radars, optical RF stereo, optical RF network, and interferoceivers.

BACKGROUND OF THE INVENTION

Inventions on the optical RF stereo, radar, and RF networks have laid the new foundations for the radar and electronic warfare technologies. The optical RF stereo utilizes optical fibers or direct lasers to achieve RF transmission and reception of widely separated RF antennas. The purposes are to setup smart RF deceptions for countering RF threats, to carry out live battle field deceptions, to assess the success of deceptions, to locate individual RF emitters hidden in RF environment for electronic intelligence gathering, as well as other applications. A recent Navy and Air Force program on the integrated defense electronic countermeasure (IDECM) is a sample of this invention.

The optical bistatic radar utilizes optical fibers or direct lasers to transit RF signals from the bistatic receiving sites directly to the transmitting site for processing. The functional objectives are to eliminate the problems associated with the conventional bistatic radars, to lower costs, and to increase the functional capabilities of radar networks. The purposes are for advancing the technology of bistatic radars, ensuring air traffic safety, managing highway traffic, monitoring ship movements in a harbor, gathering weather data, managing wild life, optimizing battle engagements, deterring low observables, and developing smart hard kill means.

The optical fiber based radars utilize optical fibers to store the initially transmitted RF signals for comparison with RF signals from reflection. Their functional objectives are to overcome or suppress the electromagnetic instabilities, to eliminate the locked waiting of RF synthesizers, to reduce the frequency of RF emissions, to dispose stringent inter pulse coherence requirements, to remove both range and Doppler ambiguities. Their purposes are for removing the system instabilities, reducing electromagnetic interferences, eliminating clutter contaminations, repelling hostile jamming and deception, suppressing the number of radar emitters, and halting the proliferation of radar systems.

The optical RF network utilizes optical fibers to centralize the RF signal generators and receivers. The network provides a new, generic, and versatile architecture for integrating the radar and electronic warfare systems. Its importance is analogous to the evolution of home entertainment systems. Forty years ago, home entertainment systems are packaged into consoles. As the technology evolves, in order to bring in the new advancements, the old system has to be discarded and replaced completely. The cost was too high for market penetration. To lower the costs of replacement and market barrier, the electronic industry abandoned the console architecture and divided individual systems into components. An upgrade is only limited to the outdated components, and not the entire system. The change drastically lowered the cost barrier in bring new technology to every home. The electronic entertainment market expands.

Component based systems have many other advantages as well in comparison with the console based systems. The speakers of a home entertainment system must be place in proper places within a listening room in order to create the realistic sound effects. It can be met by a component system, but not by a console system. Furthermore, most families have limited space in their listening rooms. It is impossible for them to accommodate the bulky consoles, but they always can make rooms for the smaller components. The evolution of home entertainment systems has led to the demise of console based systems.

The fielded radar and electronic warfare systems are all console based systems. They suffer the same deficiencies as the console based home entertainment systems, and are very costly. We just can not afford to upgrade them. Radar and electronic warfare systems in operation today are at least twenty years behind the latest technologies. Furthermore, these systems are too bulky and vulnerable. Their radar cross sections are large, and are obvious targets for missiles. One may ask, why did we not abandon the console and adopt the component based architectures for the radar and electronic warfare systems? There was a technical barrier. The architecture of component based home entertainment systems requires good audio and video connections. Coaxial cables are able to fill the requirement. However the architecture of component based radar and electronic warfare systems requires good RF connections. Coaxial cables as well as wave guides can not provide good RF connections. No other means existed. It was impossible to have the component based radar and electronic warfare systems until recently. Newly advanced optical fibers remove the technical barrier and lead to the invention of optical RF network. With the new architecture, the future radar and electronic warfare systems will not be outdated by the rapid evolution of the technologies.

Furthermore, optical RF network is an excellent vehicle in adopting the commercial off the shelf technologies. Radar and electronic warfare systems are functional specific, and are comprised of many common subsystems. However most of their subsystems are generic and readily available off the shelf. It was packaging that split these subsystem apart and forced them into consoles. The packaging excluded the use of commercial off the shelf technologies, and prevented the sharing of common subsystems. Without consoles, the restrictions imposed by packaging are eliminated.

The interferoceiver utilizes RF signal train generator to store transient RF signals and to regenerate their identical replicas for repeated analysis. Radar pulses are transient. It is a very important discovery on the investigations of transient phenomena and the radar signal processing. Since transient RF signals are so short, it was totally impossible to decipher all the information contained with a single transient RF signal. The present methods of processing transient RF signals are borrowed directly from that of processing communication signals.

Communication and transient signals are completely different. Communication signals are repetitive. We need a repetitive signal in order to have a pitch sensation. Except in very limited cases, transient signals vary from event to event and each transient signal is different. The super heterodyne technique invented by Edwin H. Armstrong is for processing the repetitive signals, not for the transient signals. Filtering and down conversion from RF to intermediate frequency (IF) are the essential steps in the method of super heterodyne signal processing. Although these steps have no diverse effects on the repetitive signals, but wipe out many essential features of a transient signal. The inability of the super heterodyne technique in handling a transient signal leads to the use of multiple transient signals, and demands these transient signals repetitively the same.

Most natural transient phenomena are not repetitive. Each radar pulse is distinct. It contains the range, Doppler, and intrinsic characteristics of a target. The inabilities of the present processing methods causes proliferation of radar systems, chaos of radar emissions, and hopelessness on passive target identifications. The interferoceiver, which was first revealed in the invention of optical fiber based radars, changes everything. The fundament problems associated with supper heterodyne techniques in radar signal processing will be eliminated.

Inventions on the optical RF stereo, serrated-roll edge for microwave antennas, and optimum edges for acoustical antennas have advanced similarities and commonalties of RF and acoustical systems or antennas to new levels. The serrated-roll edges reduce the side lobes of RF and acoustical antennas, and forge the directional antennas more directional. The objectives of these invented edges are to enhance the performances of RF and acoustical systems.

Our inventions have revolutionized the radar, and electronic warfare technologies. Efforts have started for the implementation and realization of the inventions. However, we are not satisfied with the success and continue to seek new ways in refining and advancing the inventions. We discovered some problems in our earlier inventions. One of them is the mechanical instabilities, which are more pronounced for the systems installed on movable platforms. Others are associated with the continuous probing RF waves and the weak transient signals in using interferoceivers.

The performances of optical RF stereo and radar systems depend on the knowledge of the state vectors describing separations or orientations of their respective antennas. The main objectives of these systems are for gathering information on the objects of interest. This requires that the systems be able to track or follow the said objects. Without a knowledge of the respective state vectors, these systems can not perform their tasks. As those of ordinary skill in the art can readily appreciate, the same kinds of problems are also presented in conventional RF, acoustical, sensor, and stereo systems. Likewise, the performances of nonrigid or profiled phase arrays, whether they are RF or acoustical, depends on the knowledge of the state vectors describing the locations or phase centers of their respective elements.

The tasks of tracking and following may not be difficult to accomplish for information gathering systems on fixed platforms. The tasks become more challenging on the movable platforms. When the movable platforms are in motion, they change their own state vectors in describing their headings, attitudes, vibrations, rotations, other internal motions and instabilities. Whether an object of interest is stationary or not, the aspect orientations and apparent locations of the object with respect to the moving platforms will be constantly changing, which in turn affects the performances of any sensors, cameras, or systems on the moving platform. The task becomes even more insurmountable in tracing and following the phase centers of the RF or acoustical antennas mounted on movable platforms.

Usual approaches to overcome the difficulty were to force the moving platforms in uniform motions and to suppress the internal vibrations and instabilities, for instance in synthetic aperture radar operations. The restrictions, which reduce the difficulties in tracking state vectors, exclude many interesting applications. As those of ordinary skill in the art should readily appreciate, one must advance the capabilities of tracking state vectors.

Similar situations are existed in monitoring the integrity of extended objects like buildings, bridges, and many other man made structures. As they slowly deteriorate with time, the state vectors in describing their vibrations, twistings, bendings, and other distortions undergo different changes, which in turn become are good indicators on their states of deterioration. As those of ordinary skill in the art can readily appreciate, it is also not a simple task to track these state vectors.

Similar situations exist in monitoring the actions of extended objects which may be linked together, for example the human body has body parts linked together by joints. Direct measurement of human motions and movements are often needed for generating graphic animation, virtual reality simulation, robotic control, teleoperation, medical diagnostic and rehabilitation purposes. Furthermore, in medical diagnosis and treatment such as magnetic resonance imaging (MRI) and stereotaxis, the position and motion of the body parts must be known precisely. As those of ordinary skill in the art should readily appreciate, it has been difficult to provide an excellent and precise method in measuring these motions and movements for many engineering and medical uses.

In light of the above, there is a need in the art for apparatus, which are universal and to track and trace the state vectors in describing radar, sonar, stereo, and other information gathering systems; fixed and moving platforms; as well as extended objects. Furthermore, they should be abe to handle the dynamical situations.

FOUNDATIONS OF THE INVENTION

A fundamental issue in the present invention is to trace the motions, vibrations, and internal instabilities of a platform, which may be flexible and contain movable parts. A fundamental quantity, which we must deal with, is a state vector describing the relative position of any two points on the platform. The motions, vibrations, and internal instabilities of the platform will affect this state vector, which in turn becomes a good descriptor for characterizing the platform. We will begin our discussion on its determination.

As those of ordinary skill in the art should readily appreciate, an optimum method in determining the relative position of two points on a platform is to use a method based on the kinematic differential globe positioning systems (KDGPS), which is able to provide accuracy in millimeters. The method tracks the carrier phase differentials and follows their changes for GPS signals received by navigation antennas at the two points. On the other hand, the accuracy on the orientation or attitude of the platform is directly related to the separation of two points. A larger separation will lead to a better accuracy. We must choose the separation as large as possible. It can be accomplished with a help of optical RF support network, which brings the navigation RF signals received at two points to a central location for processing with the reference to a common stable clock.

However there is a problem associated with GPS signal processing at dynamical situations. A conventional GPS receiver contains two tracking loops; the carrier-tracking loop is used to track the carrier frequency, while the code-tracking loop is used to track the coded signals. Two loops work together in an interactive process, aiding each other, to acquire and track navigation RF signals from satellites. The code-tracking loop strips off the spread-spectrum code modulation from the navigation RF signals and leaves modulations due to the Doppler shift and digital message. The carrier-tracking loop reads and removes the digital message, measures the Doppler shift. The code-tracking loop then adjusts its center frequency, to match with the carrier frequency according to a feed back from the carrier-track loop, and makes the pseudo range measurements. The carrier-tracking loop further tracks the phase variations of the received navigation RF signals. It takes times to accomplish the above tasks. The problem is not specific to a particular conventional GPS receiver, but is rather general. Conventional GPS processors update their outputs every 0.6 second, which is too slow in tracking the state vectors of interest at dynamical situations. We must modify conventional GPS signal processing to meet our needs.

Interoceivers as disclosed in the cross related applications are excellent apparatus in modifying GPS signals. If an interferoceiver stores the navigation RF signals directly from a GPS antenna and analyzes the regenerated replicas, then the interferoceiver will yield the relative Doppler shifts of all available satellites with respect to the reference platform, which hosts the GPS antenna. Hence these Doppler shifts are distinctly different and satellite's velocities are known, we can use the shifts to determine the velocity of the reference platform. However, in the dynamical situations of high frequency vibrations and instabilities, various Doppler shifts are added. We will experience difficulties in identifying each individual Doppler component. A method to avoid the complications is warranted.

Navigation RF signals are broad band and pseudo continuous wave signals. The correlator of the code-tracking loop uses a designated code to convert the navigation RF signals to narrow band and continuous wave signals from a specific satellite. The GPS coarse/acquisition (C/A) code repeats every millisecond. The GPS data rate is 50 bits/sec, which leads to a repetition of the designate C/A code for 20 times in receiving a data bit. The repetition enhances the statistical confidence of the data bits, but blurs the dynamical characteristics of high frequency vibrations and instabilities. Hence conventional GPS signal processing is not designed to handle the dynamical situations of rapid changes.

The above discussion leads us to face a fact that it takes one millisecond to single out the navigation RF signals from a specific GPS satellite. Optical fiber based RF signal train generators will have too lengthy optical fibers to store a millisecond RF signal. Generators with other type of constructions, at the present, are inferior and might not be able to regenerate high fidelity replicas. This may be an obstacle. If, instead, only a fraction of one-millisecond navigation RF signals is stored, than the distinction is lost. It becomes very similar to the case discussed above on storing RF signals directly from GPS antennas.

The entire one-millisecond navigation RF signals must be kept in order to distinct GPS signals from different satellite. An alternative method in overcoming the obstacle is to divide the one-millisecond navigation RF signal into small segments and to aggregate them coherently together in forming a single pulsed RF signal. An RF signal train generator will then store the aggregated RF signal and regenerate its replicas. Although the navigation RF signals have been segmented, the coherent aggregation restores its distinction and enhances its quality. The aggregated RF signal retains all intrinsic characteristics of the original navigation RF signal before the aggregation. An analysis of the aggregated RF signal by an interferoceiver will lead to the frequency spectrum of the relative Doppler shift of a specific satellite with respect to a platform of interest, and dynamical characteristics of the platform. Hence, with the help of interferoceivers, GPS signal processors will have the abilities in handling high frequency vibrations and instabilities in the time scale about one-millisecond or less.

As those of ordinary skill in the art should readily appreciate, an embodiment of the instant invention may use any GPS like navigation RF signals to achieve its objectives. Examples of these signals are that from Global Orbiting Navigation Satellite system (GLONASS) of Russia, or from Global Navigation Satellite System (GNSS) as planed by European Union. We may setup pseudolites to generate tailored navigation RF signals for special uses.

As those of ordinary skill in the art should further appreciate, we may use the mechanism of aggregation to enhance the statistics of weak transient signals, by aggregating several transient signals together, and to search for transient effects in continuous wave signals. Hence, the mechanism of aggregation also leads to the solutions on the problems associated with the continuous probing waves and the weak transient signals in our inventions of interferoceivers.

SUMMARY OF THE INVENTION

Embodiments of the present invention advantageously satisfy the above-identified needs in the art. The embodiments comprise means to integrate with information gathering systems, platforms, and extended objects; and provide them with descriptors. These descriptors are generic, versatile, and sophisticated; which utilize navigation RF signals to reveal the relevant direction, attitude, heading, vibration, bending, stretching, deformation, other internal motions and instabilities; which advance GPS capabilities in serving military and civilian interests; and which push the technologies for gathering information, and for monitoring integrities of extended objects into new levels. In particular, an embodiment of the invented descriptor comprises one or more antenna subsystems for receiving navigation RF signals; processors located at a processing center for analyzing the navigation RF signals to produce one or more configuration vectors; an optical RF link network with at least one optical RF link system for transiting the navigation RF signals between the antenna subsystems and the processors.

In a preferred embodiment of the present invention, GPS or GLONASS signals are used for general applications and specially tailored navigation RF signals are used for high performance descriptors. As a result, the present invention will be able to fulfill broad needs in both ends of spectrum. GPS and GLONASS signals are widely available, which makes the apparatus of the present invention easy to deploy, simple to operate, and low in cost.

Furthermore, embodiments of the present invention advance our capabilities in dealing with transient phenomena. Navigation signal processors will be able to handle the dynamical situations without a help from inertial measurement units. Interferoceivers will be able to handle weak transient and continuous signals. The arts of the present invention push cross related inventions into a higher level.

BRIEF DESCRIPTION OF THE DRAWINGS

A complete understanding of the present invention may be gained by considering the following detailed description in conjunction with the accompanying drawings, in which.

DETAILED DESCRIPTION

Figure 1:
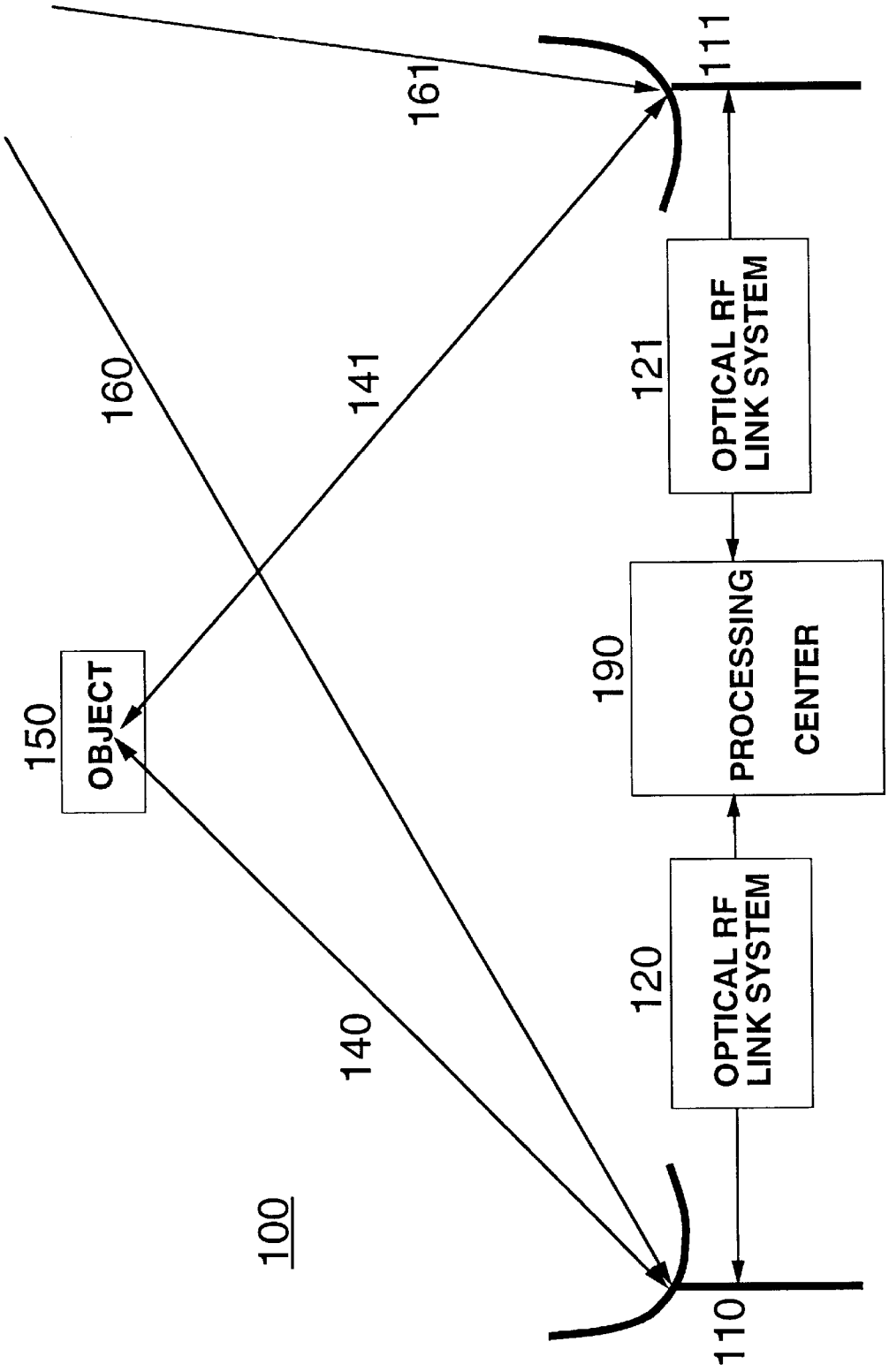
FIG. 1 shows a picture of a descriptor, which integrates with an RF system, fabricated in accordance with an embodiment of the present invention.

FIG. 1 shows a picture of a descriptor 100 fabricated in accordance with an embodiment of the present invention. The embodiment manifests an integration of the descriptor with an RF system, which is any communication, radar, electronic warfare, of RF sensor systems. As shown in the FIG. 1, descriptor 100 is comprised of an antenna network with antenna subsystems 110 and 111, optical RF link systems 120 and 121, and processing center 190. Antenna subsystems 110 and 111, which comprise one or more navigation antennas, receive navigation RF signals 160 and 161. Optical RF link systems 120 and 121 transit the received navigation RF signals to processing center 190, which houses a processor network comprised of one or more processors. By using navigation RF signals 160 and 161 as inputs, processors at processing center 190 yield quantities describing antenna positions including relative positions among the antenna subsystems in the antenna network and navigation antennas in the antenna subsystems. Those relative positions denote a configuration of the antenna network and will be referred to as its configuration vectors.

In accordance with the present invention, RF antennas of the RF system have definite mechanical relationships to antennas subsystems 110 and 111. An integration processor of the descriptor, based on the mechanical relationship, translates one or more configuration vectors of the antenna network to state vectors describing the RF system of FIG. 1. Conventional methods for processing navigation RF signals are disclosed in the cross related inventions. As those of ordinary skill in the art should readily appreciate that processing center 190 may be collocated with one of the antenna subsystems. In a case of collocation, the optical RF link system between processing center 190 and the collocated antenna subsystem may be replaced by other RF link systems. We have referred an network, comprised of at least one optical RF link system for transiting navigation RF signals, as an optical RF link network. For short, we will refer an as an RF link network.

As those of ordinary skill in the art should appreciate, for an optical based RF stereo or bistatic radar system, optical RF link systems 120 and 121 would also transit RF signals 140 and 141 between processing center 190 and the antenna subsystems. For a conventional RF stereo or bistatic radar system, optical RF link systems 120 and 121 will not transit RF signals 140 and 141. The methods for transiting RF or navigation RF signals by optical RF link systems are disclosed in the cross related inventions.

It is well known to those of ordinary skill in the art, the navigation antennas in receiving navigation RF signals are omnidirectional, and the RF antennas in receiving or transmitting RF signals are either directional or omnidirectional. It is also known to those of ordinary skill in the art that an RF antenna may receive both omnidirectional RF and navigation RF signals. As those of ordinary skill in the art should readily appreciate, for an RF antenna capable of receiving omnidirectional RF and navigation RF signals, each of antenna subsystems 110 and 1 11 may only comprise a single antenna. As shown in FIG. 1, antenna subsystem 110 receives navigation RF signals 160 as well as receives RF signals 140 from or transmits to object 150. Similarly, antenna subsystem 111 receives navigation RF signals 161, as well as receives RF signals 141 from or transmits to object 150. In this simple case, the relative position vector between antennas of antenna subsystems 110 and 111 is the only vector, although one of the antenna subsystems may be on a movable platform.

As those of ordinary skill in the art should readily appreciate, for an RF antenna capable of receiving omnidirectional RF but not navigation RF signals, each of the antenna subsystems 110 or 111 may comprise a single navigation antenna. RF antennas of the RF system are separate from the navigation antennas. As those of ordinary skill in the art would appreciate, with a proper arrangement, the phase centers for the RF and navigation antenna at each antenna subsystem site may be coincided for the sake of simplicity. If it is not, either mechanical relationships have to be specified for correlating the phase centers of the RF and navigation antennas, or the difference in the phase centers may be neglected for the RF system of interest.

As those of ordinary skill in the art should readily appreciate, for an RF antenna only capable of receiving directional RF signals, the antenna subsystem 110 or 111 may comprise a set of navigation antennas. One may have to use three navigation antennas to determine the state vectors describing the phase center and pointing direction of a directional RF antenna at each antenna site. In a preferred embodiment, the separations between these three navigation antennas should be as large as possible. The arrangement on the mechanical relationships of these antennas to perform the required functions is well known to those of ordinary skill in the art. As those of ordinary skill should readily appreciate, from the mechanical relationships, the descriptor is able to produce the state vectors of the RF system from the configuration vectors of the antenna network.

Furthermore, as those of ordinary skill in the art would appreciate, one may need six navigation antennas to determine the state vectors in describing an RF stereo or bistatic radar system with two RF antennas. The actual number of navigation antennas depends on the requirements and the existence of supplemental mechanisms, and may be higher or lower than six. For an RF system with a single RF antenna, the number of navigation antennas are comparatively reduced. If this single antenna is omnidirectional, one single navigation antenna may be enough. As those of ordinary skill in the art should further appreciate, the specific mechanical relationships between RF antennas and antenna subsystems depend on the practical situations and applications.

In further embodiments of the present invention, the descriptor integrates with an RF system, which has a number of antennas. The integrity of the state vectors provided by the descriptor for an RF systems is often important. In still further embodiment, the descriptor generates and transmits its own navigation RF signals. It is to say that the descriptor comprises pseudolites. As those of ordinary skill in the art would appreciate, by including the pseudolites, the descriptor is able to calibrate itself and to monitor the integrity of the state vectors in real time. Evaluating state vectors is often an important part in calibrating procedures of an RF system. The calibration is usually done off-line. As those of ordinary skill in the art would further appreciate, the present invention with an aid of the cross related inventions teaches the calibrations for any RF systems online and in real time.

An acoustical antenna is a portion of the opening or interface surface of any acoustical transmitting or receiving devices. These acoustical devices have the names like microphone, hydro-phone, geophone, transducer, ultrasonic transducer, speaker, hydro-speaker, acoustical sensor, and so on. The acoustical antenna defines the orientation and aperture size of an acoustical device. Application Ser. No. 07/612,997 discusses the acoustical antennas. An acoustical system has one or more of these devices. In further embodiments of the present invention, a descriptor is integrated with an acoustical system. Acoustical systems are very similar to RF systems. From the teaching of the present invention, anyone with ordinary skill in the art should be able to construct descriptors for the acoustical systems.

An optical antenna is an opening, window, mirror, or lense of any optical transmitting and receiving systems. These optical systems have the names like lidar, laser, camera, telescope, search light, and so on. An optical antenna defines the orientation and aperture size of a mean for an optical system to receive or transmit of light. In further embodiments of the present invention, a descriptor is integrated with an optical system. Optical systems are very similar to RF systems. From the teaching of the present invention, anyone with ordinary skill in the art should be able to construct descriptors for the optical systems.

In accordance with the present invention, a descriptor may be integrated with anyone of RF, acoustical, and optical systems. We will refer to these systems as physical systems, and their antennas as physical antennas.

Figure 2:
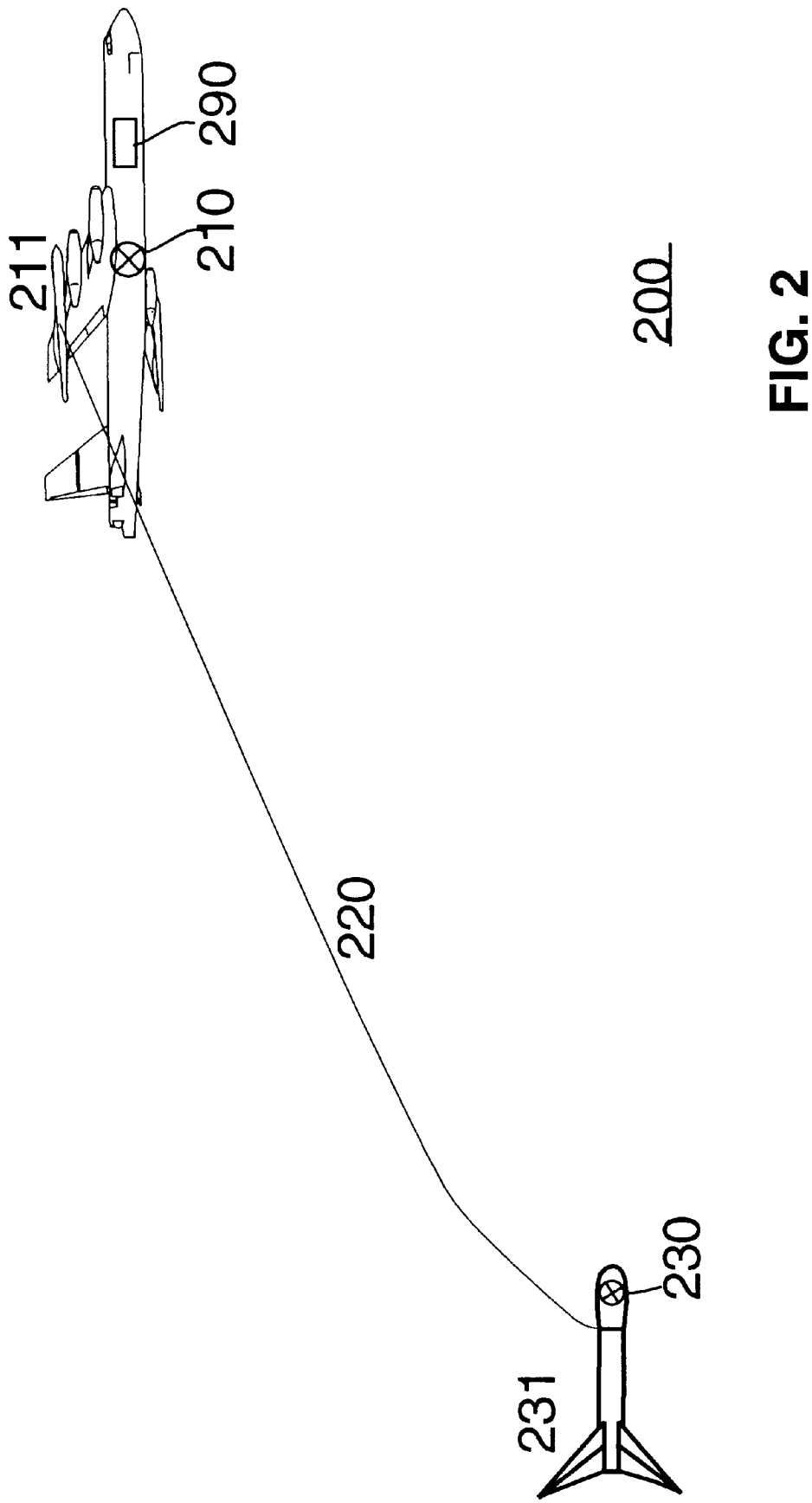
FIG. 2 shows a picture of a descriptor, which integrates with an airborne RF system, fabricated in accordance with an embodiment of the present invention.

FIG. 2 shows a picture of a descriptor 200, fabricated in accordance with an embodiment of the present invention. The embodiment manifests an integration of the descriptor with an airborne RF system. As shown in the FIG. 2, descriptor 200 is comprised of antenna subsystems 210 and 230, optical RF link system 220, and processing center 290, which is collocated with antenna subsystem 210 on the aircraft 211. Antenna subsystem 230 is on vehicle 231, which is either towed by or tethered to aircraft 211. Furthermore, optical RF link system 220 is either a part of the towed or tethered cable. As those of ordinary skill in the art should readily appreciate, embodiment FIG. 2 is a generalization of embodiment FIG. 1. For the sake of simplicity, a number of constituents have not been depicted in FIG. 2. Due to air turbulence, towed vehicle 231 may have chaotic motions. As those of ordinary skill in the art would further appreciate, aircraft 211 may be a space shuttle and vehicle 231 may be a second aircraft. Instead of a towed or tethered fiber line, it can be a laser based optical RF link system linking two aircraft.

An airborne RF system may have different designs and implementations to meet various functional requirements. As those of ordinary skill in the art should appreciate, the processing methods and the antenna subsystems of the descriptor are selected according to the requirements. Now we will discuss some of airborne RF systems.

In a preferred embodiment, for an RF system like IDECM, a towed antenna subsystem 230 comprises a single navigation antenna and is integrated with one omnidirectional RF antenna. By using navigation RF signals from antenna subsystems 210 and 230, in accordance with the present invention, the descriptor 200 would deliver a state vector in real time to indicate the relative position of the towed decoy 231 with respect to the aircraft 211. Under a hostile threat, the pilot maneuvers the aircraft either to escape or to lure the threat with the towed decoy. As those of ordinary skill in the art should readily appreciate, a timely knowledge of the relative position vector is important for the success of the decoy 231 in countering a hostile missile threat to protect the aircraft 211.

In a preferred embodiment, for an RF system of more advanced electronic countermeasures, antenna subsystem 210 onboard aircraft 211 in addition to its own navigation antennas may integrate with RF antennas for transmitting and/or receiving RF signals. In accordance with the present invention, the descriptor 200 may deliver timely information of the relative position vector to be use for the methods of passive ranging, passive Doppler, angle pull-off, range gate pull-off, pulse on noise, smart deceptions or other countermeasures. For instance, the conventional range gate pull-off method does not provide a decoy for a hostile tracker to log on. After the pull-off, the hostile tracker will initiate the search mode in seeking the victim. With a timely knowledge of the relative position vector, we will be able to provide the hostile tracker with decoy 231 to log on. The hostile tracker will not be able to victimize the aircraft 211 again after the pull off. As those of ordinary skill in the art should readily appreciate, the present invention not only advances the arts of cross related inventions but also the arts of conventional countermeasure techniques.

In a preferred embodiment, for an RF system of stereo synthetic aperture radars, the processor in aircraft 211 uses the KDGPS method to derive the relative position vector between the receiving antenna subsystem 230 and the main antenna subsystem 210. The method of stereo synthetic aperture radars is a method of coherence and leads to three dimensional synthetic aperture radar images. The accuracy on the relative position vector should be as high as possible. In accordance with the present invention, the preferred embodiment of descriptor 200 is able to meet the needed accuracy. However, a problem still remains on whether the accuracy is timely. It is the slowness of KDGPS method for not being able to handle rapid changes of motion and dynamics. The present invention teaches two approaches to overcome the problem. One of them is to restrict the flight of aircraft 211, such that vehicle 231 will be in a uniform motion. Second one, which will be discussed later, is a new invention in utilizing an aggregator.

In a preferred embodiment, for an RF system of smart missiles or bombs, optical RF link system 220 is comprised of a tethered fiber linking aircraft 211 with a smart missile or bomb. The tethered missile or bomb under the guidance of bistatic radar zooms into target of interest. In accordance with the present invention, descriptor 200 provides the needed relative position vector to pin point the target and the needed information for the RF stereo system to locate the hostile threats on the road to the target. After the deployment of first tethered missile or bomb, with the help of other onboard sensors, we will have the information on its success, the exact position of the target, errors in planning, and locations of threats. If the first missile or bomb did not neutralize the target, with the newly acquired information, we shall be able to assure the success with a second missile or bomb. As those of ordinary skill in the art should readily appreciate, the descriptor is critical to the absolute success of smart missiles or bombs.

Corresponding to an airborne RF system of FIG. 2, we may have an optical system with two aircraft taking three dimensional aerial photos. The relative position between two cameras onboard each aircraft must be precisely known and photos precisely synchronized in order to reconstruct three dimensional images. It was not a simple task to measure precise relative position between two aircraft on flight. In a preferred embodiment of the present invention, said optical system is integrated with a descriptor through a direct laser link to provide the required precision.

Figure 3:
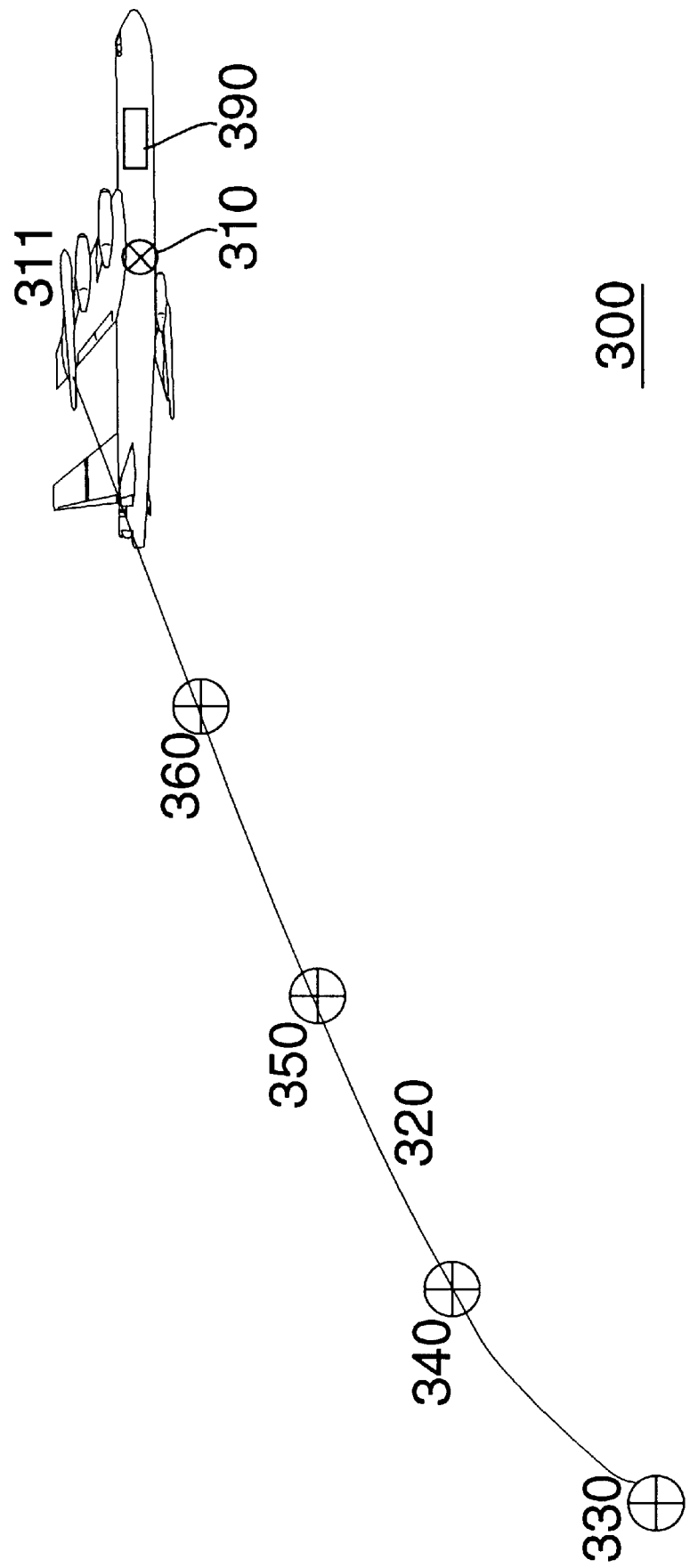
FIG. 3 shows a picture of a descriptor, which integrates with a towed phase array, fabricated in accordance with an embodiment of the present invention.

FIG. 3 shows a picture of a descriptor 300, fabricated in accordance with an embodiment of the present invention. The embodiment manifests an integration of the descriptor with a towed phase array. Descriptor 300 is comprised of antenna subsystems 310, 330, 340, 350, 360, optical RF link system 320, and processing center 390, which is collocated with antenna subsystem 310 on the aircraft 311. Antenna subsystems 330, 340, 350, and 360 are towed by aircraft 311. Due to air turbulence, these antenna subsystems may have chaotic motions. Furthermore, optical RF link system 320 may be a part of the towed cable. As those of ordinary skill in the art should readily appreciate, the embodiment FIG. 3 is a generalization of embodiment FIG. 1 with more antenna subsystems. For the sake of simplicity, a number of constituents have not been depicted in FIG. 3.

In a preferred embodiment, for a towed phase array, each towed antenna subsystems comprises a single navigation antenna and is integrated with an omnidirectional RF antenna. The antennas in each pair share a common phase center. By using navigation RF signals from the antenna subsystems, in accordance with the present invention, the descriptor 300 would deliver state vectors in real time to indicate the relative positions among the RF antennas. As those of ordinary skill in the art should readily appreciate, the timely knowledge of relative position vectors is important for the success of a towed phase array.

A phase array is a coherent apparatus. For a ground based phase array, we rigidly maintain the relative positions with high precision to meet the coherence requirements. For a towed phase array, the relative positions may vary and cause difficulties. The present invention teaches the tracking of these positions precisely in real time as an alternative. As those of ordinary skill in the art should readily appreciate, with a knowledge of precise relative position vectors, the coherence of a towed phase array can be restored during the signal processing.

The towed phase array elements may have inevitable chaotic and unstable motions. A general KDGPS processor may have difficulties providing timely and accurate relative positions in the dynamical situations of these motions. If the KDGPS processor is not able to perform its function, the present invention teaches the use of an aggregator and interferoceiver to track the relative positions of the phase array elements. As anyone with ordinary skill in the art would know that the chaotic and unstable motions have caused many problems in conventional towed phase arrays. These problems no longer exist in the present invention.

Corresponding to an RF phase array towed by an aircraft, we may have an acoustical phase array towed by a ship. Due to the wake and turbulence sea states, the conventional towed acoustical arrays have similar problems as mentioned above. In a preferred embodiment of the present invention, the acoustical phase array is integrated with a descriptor. As those of ordinary skill in the art should readily appreciate, the integration remove all these problems.

Figure 4:
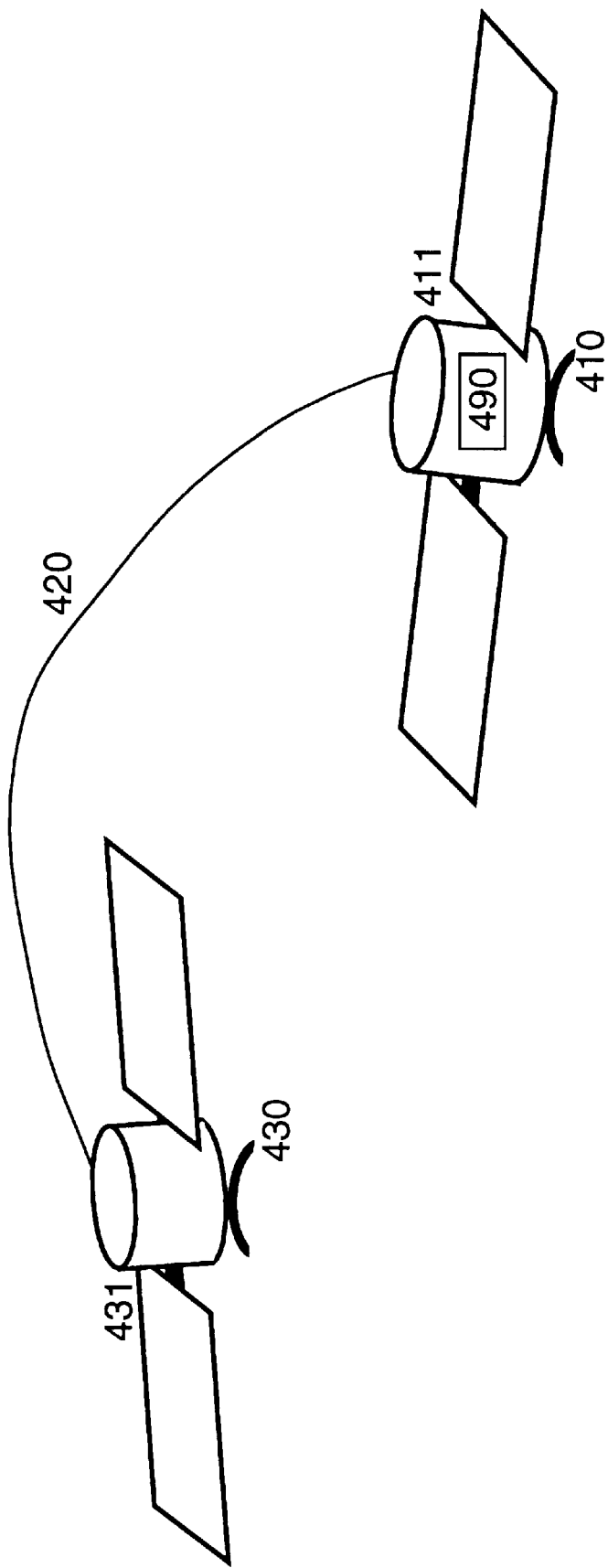
FIG. 4 shows a picture of a descriptor, which integrates with a space based RF system, fabricated in accordance with an embodiment of the present invention.

FIG. 4 shows a picture of a descriptor 400 fabricated in accordance with an embodiment of the present invention. The embodiment manifests an integration of a descriptor with a space based RF system. As shown in FIG. 4, descriptor 400 is comprised of antenna subsystems 410, and 430, optical RF link system 420, and processing center 490, which is collocated with antenna subsystem 410 on the satellite 411. Antenna subsystem 430 on satellite 431 is linked to satellite 411 either through optical fiber or laser based optical RF link system 420. As those of ordinary skill in the art should readily appreciate, embodiment FIG. 4 is a generalization of embodiment FIG. 1. For the sake of simplicity, a number of constituents have not been depicted in FIG. 4. As those of ordinary skill in the art would further appreciate, satellite 431 may be a towed vehicle.

Space based RF systems are very similar to those airborne RF systems discussed above. We will not repeat many similar systems here. However one of the systems reserves special attention. It is the large dimension phase array, for instance more than 100 ft in dimension. The array comprises a number of elements. In conventional approaches, the elements confined in a plane, and their spacings must rigidly maintained. The stringent requirements have excluded the deployment of space based phase arrays with large dimensions. The present invention provides a method to overcome the stringent requirements and turns the space based large dimension phase array into a reality. The advantages of a large dimension phase array are well known to those of ordinary skill in the art.

In accordance with the present invention, the antenna subsystems for each element of the phase array send both received RF and navigation RF signals through optical RF link systems to the processing center. From the navigation RF signals, descriptor 400 produces the state vectors which describe the relative positions among the phase array elements and the phase centers of RF antennas integrated with the antenna subsystems. With the state vectors as inputs, RF receivers then timely track the relative phases of the RF signals received at each element of the phase array. The present invention further teaches adjustments of the relative phases of RF signals for transmissions at the elements according to the timely knowledge of the state vectors. It is well known to those with ordinary skill in the art, the timely knowledge on the relative phases of RF signals at the elements makes the stringent requirements on the phase arrays unnecessary. The towed and large dimension space borne phase arrays are the nonrigid phase arrays. As those in the ordinary skill should appreciate, the present invention has overcome the difficult problems in the nonrigid phase arrays.

As those of ordinary skill in the art should further appreciate, the success of a large dimension phase array depends on the integrity of the optical RF support network. In preferred embodiment of the present invention, descriptor 400 further comprises pseudolites for transmitting navigation RF signals to receive by receiving antenna subsystems for self calibrations and integrity monitoring to assure the integrity of the optical RF support network.

Corresponding to a space base phase array towed by an aircraft, we may have any acoustical arrays submerging under or RF phase arrays floating on a water surface. Due to the surface waves, conventional arrays will not be able to perform their functions. In a preferred embodiment of the present invention, each surface phase array is integrated with a descriptor. As those of ordinary skill in the art should readily appreciate, the integration removes the surface wave effects on these arrays.

Figure 5:
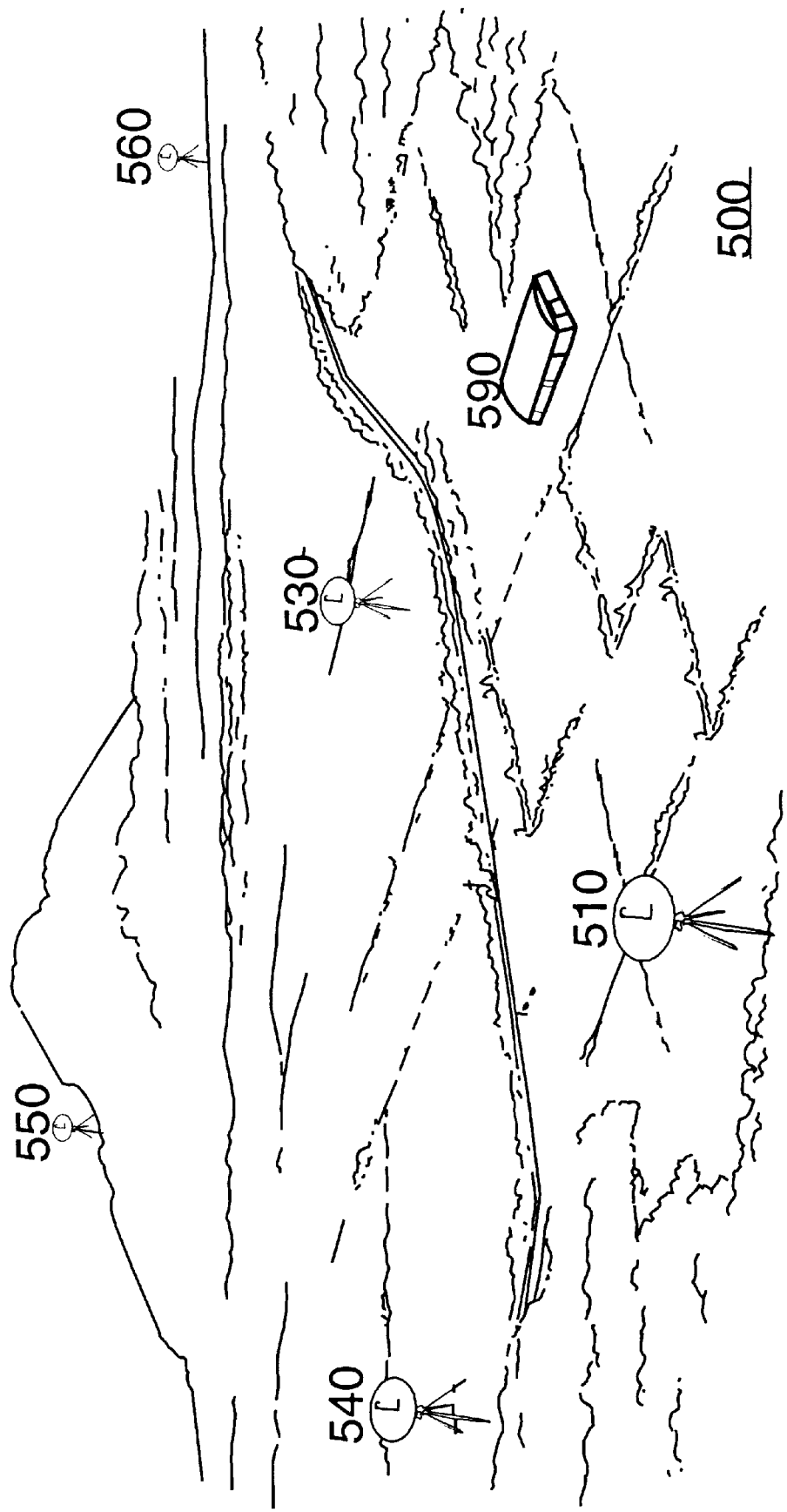
FIG. 5 shows a picture of a descriptor, which integrates with a profiled phase array, fabricated in accordance with an embodiment of the present invention.

FIG. 5 shows a picture of a descriptor fabricated in accordance with an embodiment of the present invention. The embodiment manifests an integration of a descriptor with a profiled phase array. Descriptor 500 is comprised of antenna subsystems 510, 530, 540, 550, 560, etc., optical RF link systems, and processing center 590. Antenna subsystems 510, 530, 540, 550, 560, etc. are linked to processing center 590 through the optical RF link systems. The number of antenna subsystems depends on the needs. If some of these antenna subsystems are collocated with the processing center, they may be linked through other RF link systems. Embodiment FIG. 5 is a generalization of embodiment FIG. 1. For the sake of simplicity, a number of constituents have not been depicted in FIG. 5.

As those of ordinary skill in the art should readily appreciate, the physical principle for a profile antenna is the same as that of a space borne phase array antenna. In accordance with the present invention, the descriptor tracks all relevant phase for the array. Conventional phase arrays, like those in the radio astronomy, are confined to a plane. The ground site for a phase array has to be specially prepared. It was impossible to deploy a phase array in high mountains or in the metropolitan suburbs. Now the obstacle no longer exists.

Many applications for the profiled phase are anticipated. One of them is for the stealthy battleship. As its radar cross section decreases, one must reduce the radar cross sections of RF antennas or conventional phase arrays. Due to the special mechanical requirements on shapes, their cross sections can not be reduced. No such requirements on a profiled phase array. As those of ordinary skill in the art would appreciate, the present invention teaches a method to reduce the radar cross sections of RF antennas and phase arrays.

Profiled acoustical phase arrays have many applications. One of them is to monitor earth quakes or man made earth quakes for natural sources exploration. Due to movements of surfaces in a earth quake, elements of a profiled acoustical phase array displaces and the phases of a seismic wave received by the array become distorted. The distortions must be timely corrected in order to construct the images on the structure of the strata with an interferoceiver. In a preferred embodiment of the present invention, descriptor 500 is integrated with the profiled acoustical phase arrays to track the element movements and to correct phase distortions resulted form the displacement. As those of ordinary skill in the art would further appreciate, the present invention advances the art of parent inventions on interferoceivers.

Figure 6:
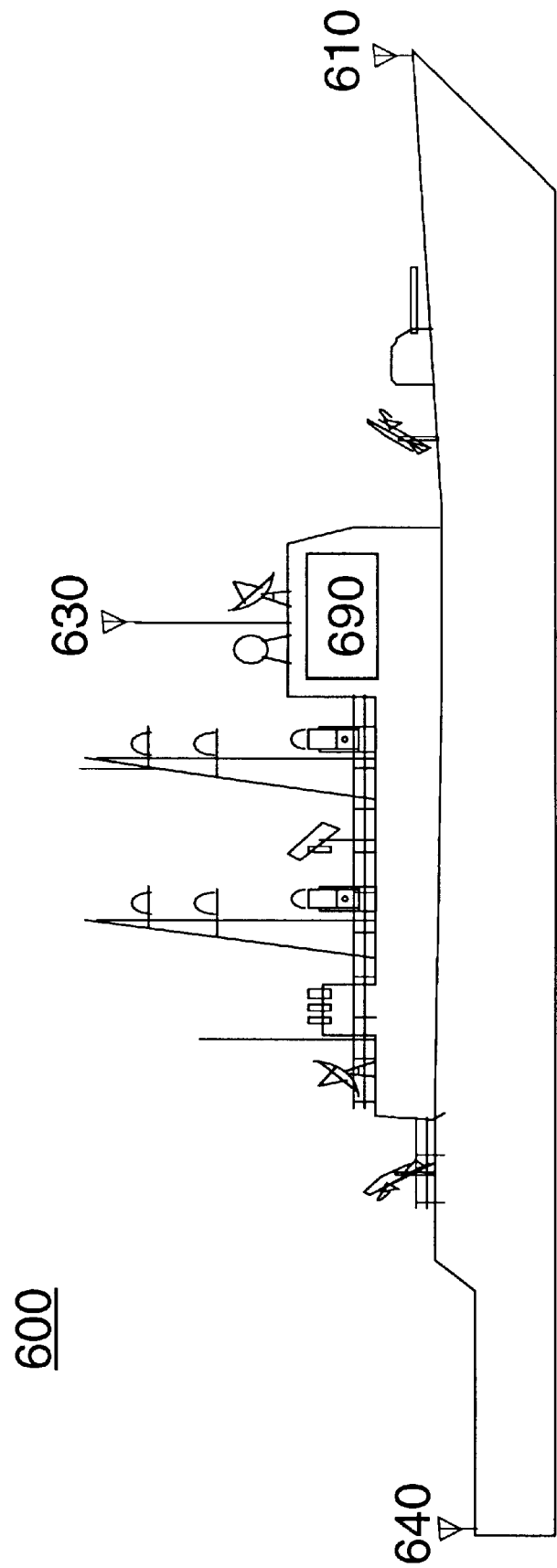
FIG. 6 shows a picture of a descriptor, which integrates with a movable platform, fabricated in accordance with an embodiment of the present invention.

FIG. 6 shows a picture of a descriptor fabricated in accordance with an embodiment of the present invention. The embodiment manifests an integration of a descriptor with a movable platform. Descriptor 600 is comprised of antenna subsystems 610, 630, and 540, optical RF link systems, and processing center 690. Antenna subsystems 610, 530, and 540 are linked to processing center 690 through the optical RF link systems. If some of these antenna subsystems are collocated with the processing center, they may be linked through other RF link systems. These antenna subsystems are installed on the movable platform. The installation defines an arrangement of mechanical relationships between the antenna subsystems and the movable platform. As those of ordinary skill in the art should readily appreciate, embodiment FIG. 6 is a generalization of embodiment FIG. 1. For the sake of simplicity, a number of constituents have not been depicted in FIG. 6.

The movable platform in FIG. 6 depicts a battleship. In accordance with the present invention, by using navigation RF signals from antenna subsystems 610, 630, and 640, descriptor 600 would deliver configuration vectors in real time to indicate the relative and exact positions of these antenna subsystems. An integration processor, based on the mechanical relationships between the antenna subsystems and the movable platform then translates configuration vectors to state vectors in describing the heading, attitude, and location of the battleship. In a preferred embodiment, the separations between antenna subsystems should be made as large as possible. As those of ordinary skill in the art should readily appreciate, larger separations would lead to better accuracies in the attitude.

The chaotic motions of sea states and vibrations of ship structures make the situation dynamical which causes relative positions between antenna subsystems varying with time. The state vectors will further describe the rotation, vibration, bending, twisting, stretching of the battleship. In a preferred embodiment, descriptor 600 will use one or more aggregators and interferoceivers to process the navigation RF signals. According to the theory of the present invention, the aggregators and interferoceivers will remove the system errors on the attitude of the battleship caused by the chaotic motions of sea states and vibrations of ship structures.

As those of ordinary skill in the art should readily appreciate, a knowledge, on the rotation, vibration, bending, twisting, stretching of the battleship, is important in order to achieve a high accurate attitude determination of a battleship. Conventional methods, with the help from gyroscopes, often use the local gravitational vector to derive the attitude. The gravitational vector varies with the location, A gyroscope needs constant calibrations, which are difficult at the dynamical situations of chaotic motions and vibrations. As those of ordinary skill in the art should further appreciate, the present invention has advanced the art in attitude determinations of any platform. A higher accuracy in the attitude will lead to a better performance of hard and soft kill systems onboard of a battleship. The present invention has also advanced the art of fighting power and survivability of battleships.

The knowledge on the attitude accuracy is critical for many information gathering systems onboard a movable platform. It is well known to those of ordinary skill in the art that cameras and a number of sensors are directional. When these cameras and sensors are placed onboard a movable platform, their performances are affected by the platform attitude uncertainty. It is especially true for an aerial camera on taking high resolution stereo photos. As those of ordinary skill in the art should readily appreciate, the present invention leads to high accurate attitude determination and assures the performance of these cameras and sensors.

As those of ordinary skill in the art should further appreciate, the accuracy in the attitude depends on the integrity of the optical RF support network. In preferred embodiment of the present invention, descriptor 600 further comprises means for transmitting, receiving, and processing the self generated navigation RF signals for calibration. The self calibration assures the integrity of the optical RF support network. The method to perform a calibration is well known to those of ordinary skill in the art.

Due to bending, twisting, stretching, deformation, and vibration, the local attitudes at different portions of a battleship are not the same. In a preferred embodiment, according to the needs, more navigation antennas are installed onboard a battleship. These antennas are usually low cost patch antennas. In accordance with the embodiment of the present invention, the processing is done at the centralized location. Many patch antennas can share a common aggregator and interferoceiver. The cost of using a large number of navigation antennas are acceptable. As those of ordinary skill in the art should readily appreciate, the localization further increase the effectiveness of each electronic warfare system onboard a battleship.

The ability of the present invention in revealing the characterizations of the localized bending, twisting, stretching, deformation, and vibration lead to many important applications. As those of ordinary skill in the art should further appreciate, we may use these characterizations to monitor the integrities of ship structures, to investigate ship dynamics under various sea states, and to watch ship acoustical signatures under stealth operations. Furthermore, we may use a descriptor to monitor aircraft structures, and to investigate aircraft dynamics during maneuvers. We may use profiled acoustical phase arrays to localize the faults in any mechanical structures.

Figure 7:
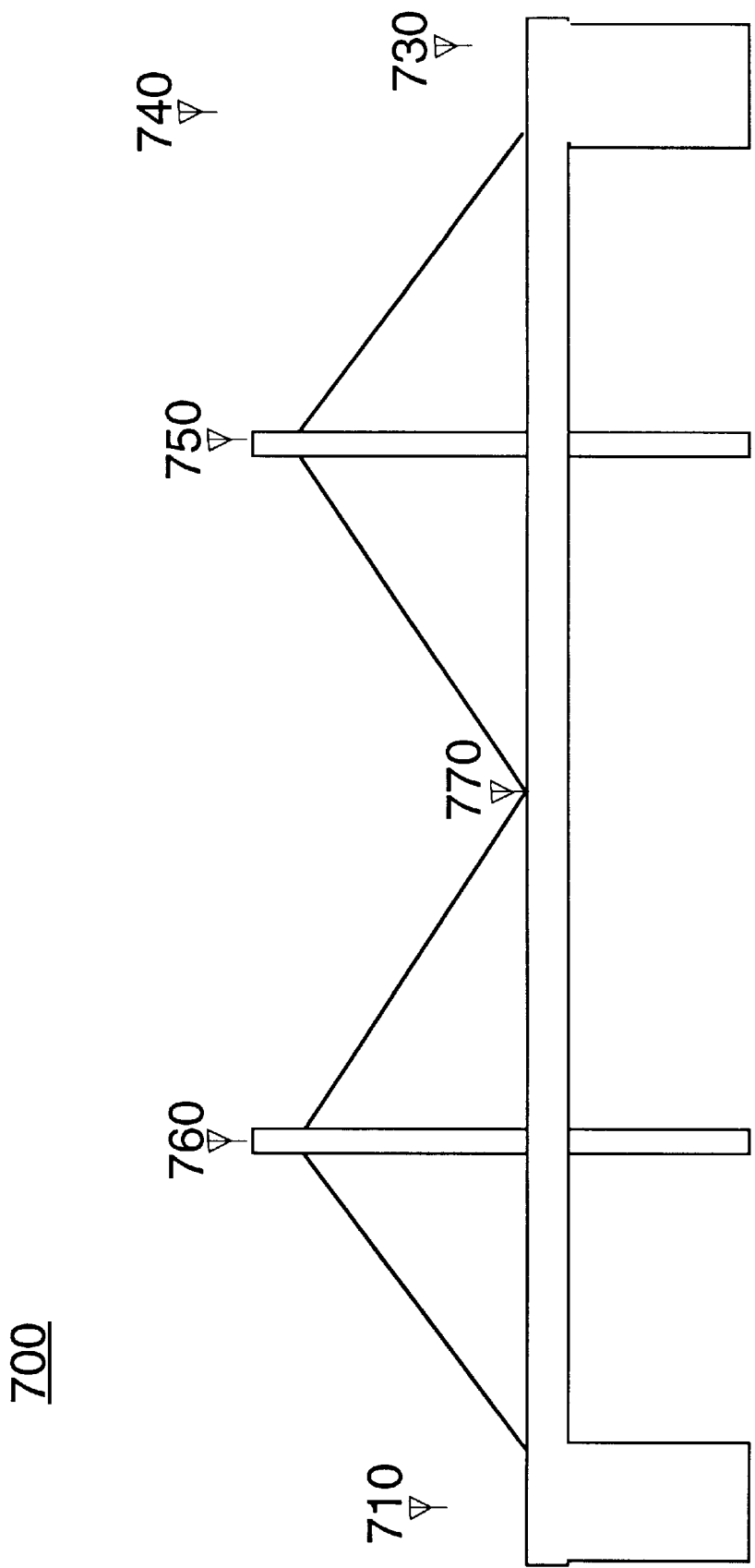
FIG. 7 shows a picture of a descriptor, which integrates with an extended object, fabricated in accordance with an embodiment of the present invention.

FIG. 7 shows a picture of a descriptor fabricated in accordance with an embodiment of the present invention. The embodiment manifests the integration of a descriptor with an extended object, which may be a bridge, building, tower, person, etc. As depicted in FIG. 1, descriptor 700 is for monitoring the integrity of a bridge. It is comprised of navigation antennas 710, 730, 740, 750, 760, 770, etc., optical RF link systems, and a processing center. The antennas are linked to the processing center through the optical RF link systems. If some of these antennas are collocated with the processing center, they may be linked through other RF link systems. As those of ordinary skill in the art should readily appreciate, embodiment FIG. 7 is a generalization of embodiment FIG. 1. For the sake of simplicity, a number of constituents have not been depicted in FIG. 7.

As depicted in FIG. 7, antennas 710, 730, and 740 are installed on the land for references. Antennas 750, 760, and 770 are installed on points of interest, where the bridge structure will be examined. The installations of the antennas subsystems define an arrangement on the mechanical relationships with the extended object, which is a bridge in the present case. In accordance with the present invention, by using navigation RF signals from antenna subsystems 710, 730, 740, 750, 760, 770, etc., descriptor 600 would deliver configuration vectors in real time to indicate the relative and exact positions of these antenna subsystems. An integration processor, based on the mechanical relationships between the antenna subsystems and the extended objects then translates configuration vectors to state vectors in describing a vibration, bending, twisting, stretching, deformation, or motion of the extended object.

As those of ordinary skill in the art should readily appreciate, with an accuracy provided by KDGPS, descriptor 700 is able to measure precisely the bending, twisting, stretching, deformation, or vibration at any point of interest. An excessive bending, twisting, stretching, deformation, or vibration means a deterioration of the structure. As those of ordinary skill in the art should further appreciate, the present invention provides a simple and robust method in monitoring or surveying the integrities of extended objects.

It is well known to those of ordinary skill in the art, the vibration frequency for a bridge, building, or tower is low. In the existence of high frequency vibrations, a preferred embodiment of the present invention would either use an aggregator and interferoceiver in processing the navigation RF signals, or use specialized pseudolites and navigation RF signals, which can reduce the time intervals in sorting out the navigation RF signals from a specific pseudolite.

It is also known to those of ordinary skill in the art, a human body is an extended object. Navigation patch antennas are light. These antennas can be pasted on the human body or knitted into a body suit. With patch antennas on a human body, the descriptor will provide the state vectors to describing the motions and movements of for the body. In a preferred embodiment, specialized pseudolites and navigation RF signals will be used. Small body movements affecting ultrasonic images become easier to identify. An animation director or robotic engineer will then have more control on capturing human actions to suit his imagination.

Figure 8:
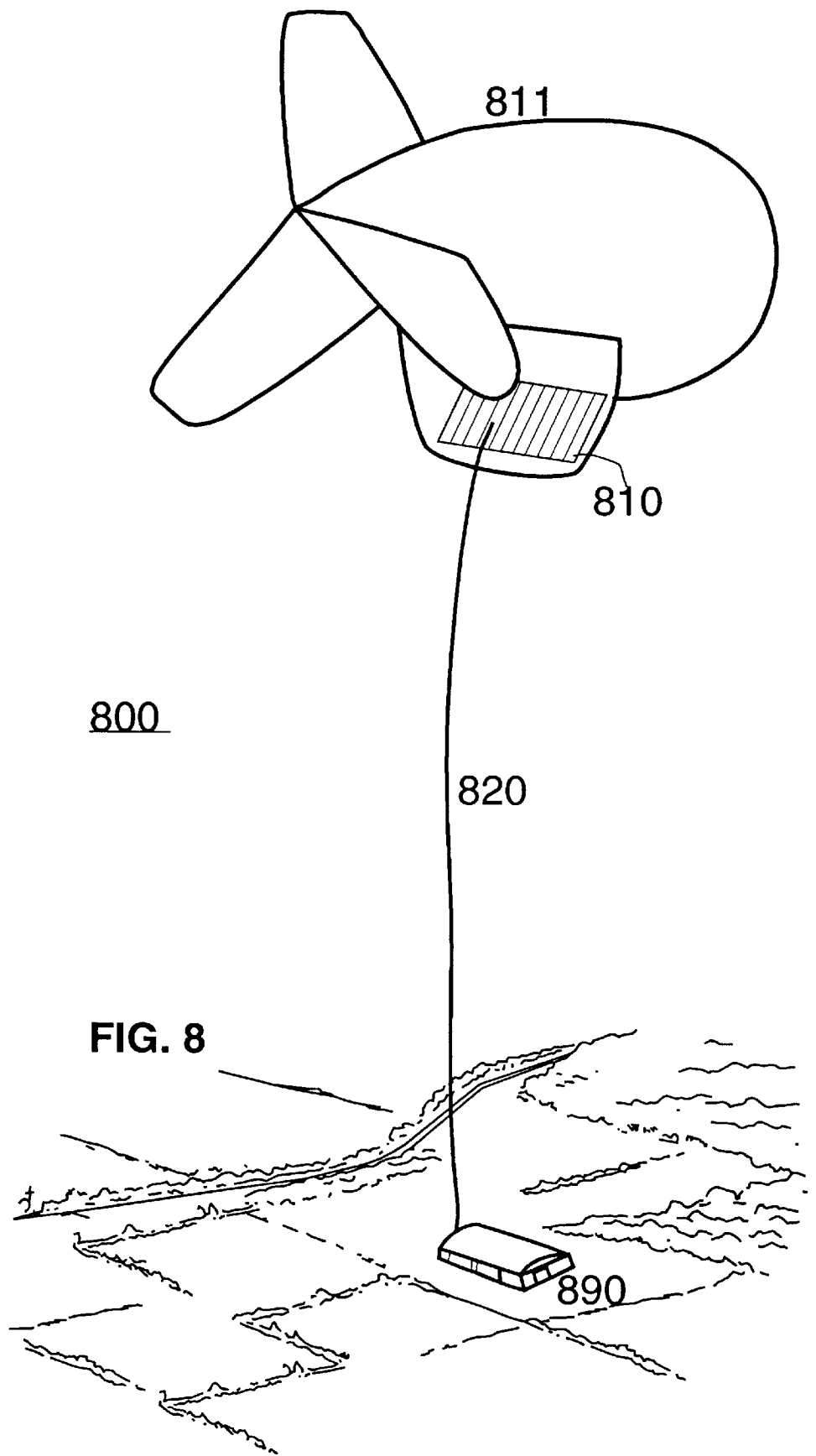
FIG. 8 shows a picture of a descriptor, which integrates with a surveillance system, fabricated in accordance with an embodiment of the present invention.

Movable platforms and extended objects are the structured objects. Embodiments of FIG. 6 and FIG. 8 are for the illustrations. A descriptor may be integrated with any structured objects to investigate or to describe their mechanical characteristics.

FIG. 8 shows a picture of a descriptor fabricated in accordance with an embodiment of the present invention. The embodiment manifests an integration of the descriptor with a surveillance system, which is housed inside a tethered blimp 811. As shown in FIG. 8, descriptor 800 is comprised of an antenna subsystems 810, optical RF link system 820, and processing center 890. Antenna subsystem 810 inside blimp 811 is linked to processing center 890 through optical fiber optical RF link system 820. As those of ordinary skill in the art should readily appreciate, embodiment FIG. 8 is a generalization of embodiment FIG. 1 with a single antenna subsystem. For the sake of simplicity, a number of constituents have not been depicted in FIG. 8.

In a preferred embodiment for passive surveillance, the RF antenna, which is directional and rotatable, sends its receiving RF signals to the processing center through optical fiber optical RF link system 820. Blimp 811 may have other sensors and cameras. As those of ordinary skill in the art should readily appreciate, the present invention reduces the loads of the blimp and many advanced processing methods can be used to enhance sophistications of the passive surveillance.

In a simple operation according with the present invention, descriptor 800 provides a state vector to log blimp 811 position, and state vectors to describe the orientation of the RF antenna. Processing center 890 then process the RF signals to identify the unknown active emitters and their angle bearings with the help of known emitters. Radiations emitted by television stations are good bistatic radar sources. In bistatic mode operation, surveillance system in FIG. 1 may be used to passively locate and track a target of interest.

Descriptor 800 with the help of aggregator provides a state vector to describe motions of blimp 811. In further embodiments of the present invention, interferoceivers are used to process the RF signals. Processing center 890 becomes capable of identifying intrinsic features of unknown objects, their relative motions with respect to blimp 811. As those of ordinary skill in the art will appreciate, in a manner similar to locating remote stars, surveillance system in FIG. 1 will have the capacities of locating unknown emitters from motions of blimp 811.

In a preferred embodiment for active surveillance, the RF antenna becomes a part of a radar system for transmitting and receiving radar signals. Optical RF link system 820 sends RF signals from blimp 811 to center 890 for processing at the ground. In further embodiments of the present inventions, the art of optical fiber based radars is incorporated to process these signals.

It is well known to those of ordinary skill in the art, blimp based radars are used for the surveillance for drug trafficking along the border. These radars are conventional. They have inherited problems in resisting clutter and background contaminations, in resolving both range and Doppler ambiguities, and in revealing the identities of the target. Drug trafficking vehicles can easily penetrate the border without being detected by these radars. The techniques revealed in optical fiber based radars removes all the inherited problems. The drug trafficking vehicles will not be able to escape detection. As those of ordinary skill in the art should appreciate, the motions of the blimp clouds the detection abilities of the optical fiber based radar. In a preferred embodiment, descriptor 800 uses an aggregator to process the navigation RF signals from antenna subsystems 810 and to track the motions of the blimp. It is well known to those of ordinary skill in the art, the cloudiness introduced by the blimp can be clarified with a knowledge of the motions. The present invention has advanced the art of optical fiber based radars.

In further embodiments, a blimp may only carry one or more detection instruments or sensor like thermometer, anonometer, barometer, hydrometer, spectrometer, chromatography, and so on. As those of ordinary skill in the arts should appreciate, the present invention will be able to measure atmosphere conditions or any quantities of interest at precise locations in the air.

Figure 9:
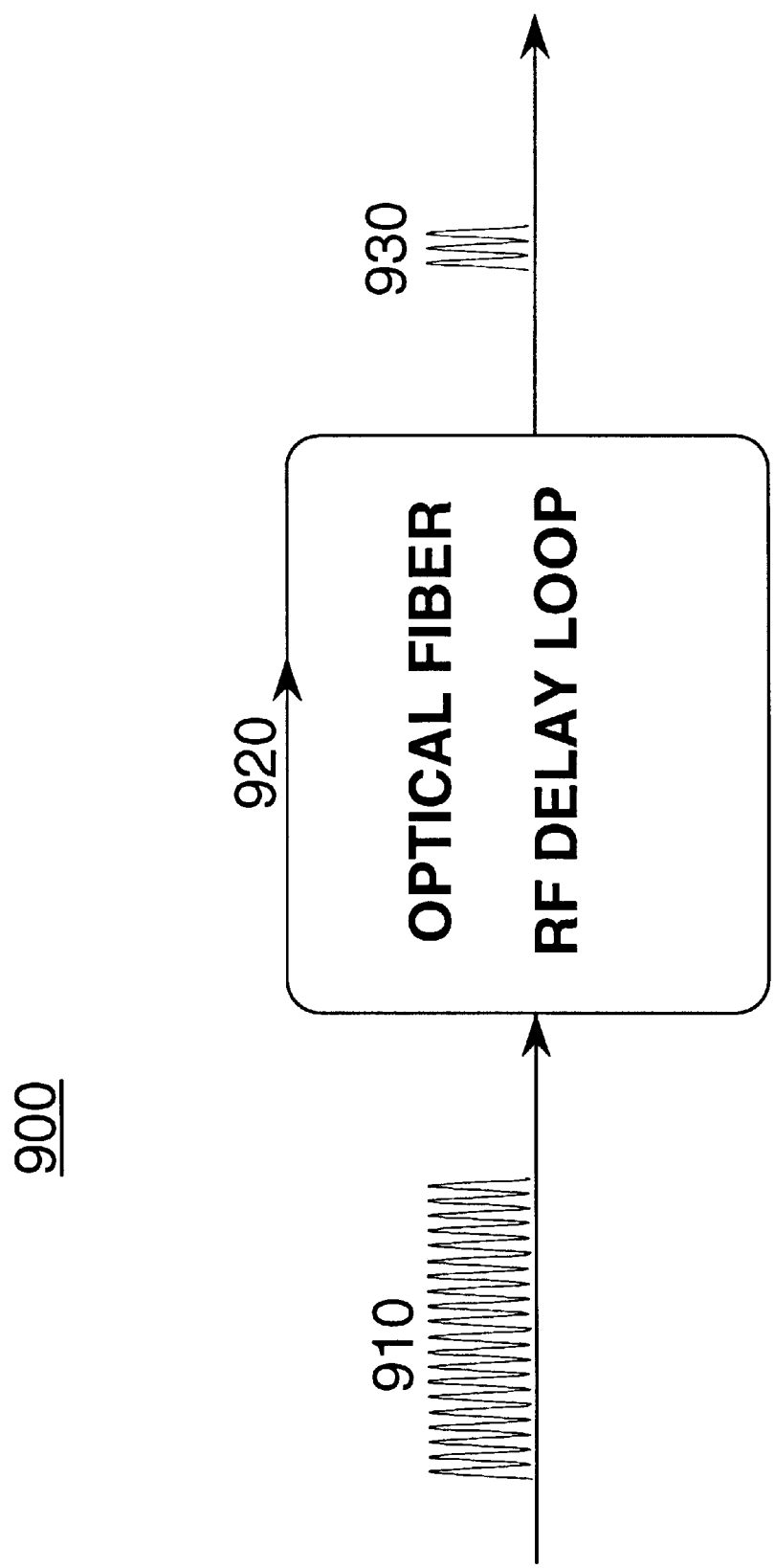
FIG. 9 shows a diagram of an aggregator, which aggregates a train of continuous or pulsed RF signals into a single pulsed RF signal, fabricated in accordance with an embodiment of the present invention.

FIG. 9 shows a diagram of an aggregator 900 fabricated in accordance with an embodiment of the present invention. As shown in FIG. 9, the aggregator 900 is comprised of an optical fiber RF delay loop 920, which receives a train of continuous RF signals 910 as an input, then aggregates the train into a single pulsed RF signal 930. Aggregators with other type of constructions are possible. However they are, at the present, more inferior than that with optical fibers. As the technology evolves, anyone with ordinary skill in the art should readily appreciate that such inferiorities will not persist. Surface acoustical devices are most likely candidates in the near future for constructing special aggregators in place of optical fibers. Furthermore, new features may be added to aggregators to make them more reliable. One of these features is a compensation mechanism to prevent the performance degradations.

The optical fiber RF delay loop 920, which is described in cross related applications, comprises a switchable coupler, isolator, loop switch, in-line optical amplifier, and optical fiber loop. In accordance with the present invention, the length (l) of RF delay loop 920 is equal to an integer (n) times the carrier wave length ($\lambda$), where $l=n\lambda$ is the loop selection equation; and is far less than the length (L) of the continuous RF signal train 910, where $l \ll L$. In a preferred embodiment, RF delay loop 920 is tunable to accommodate variations of the carrier wave length ($\lambda$). The switchable coupler switches the continuous RF signal train 910 into the loop, and the isolator assures the RF signal only circulating in one direction. When the first segment of the signal train 910 fills the whole loop, a second segment is arrived and switched into the loop. The first and second segments circulate together in the loop. Due to the selection of the loop length, the second segment is coherently added to the first segment. When they have been completely aggregated together, a third segment is arrived and switched into the loop again. The aggregated segments and third segment circulate together in the loop. The third segment is aggregated into the aggregated segments. The step repeats over and over, until a selected part of or whole continuous RF signal train is completely switched into the loop. The above mechanism of circulation changes a train of RF signals into a pulsed RF signal. The switchable coupler then switches the pulsed RF signal to leave the loop as an output. The loop switch is a device to purge residuals in the loop, to prepare for the arrival of new signal trains, and to eliminate the interference between the pulsed RF signal and signal trains. The in-line optical amplifier is usually not needed for a simple aggregator. However, an inclusion of the in-line optical amplifier increases the functional capabilities. The aggregator will be able to receive long RF signal trains or to store the aggregated RF signal for later use.

The above process divides a continuous RF signal train 910 into segments and aggregates them into a single pulsed RF signal. The loop comprises of low loss optical fibers and all segments are weighted equally in the coherent aggregation. During the process, common characteristics in the continuous RF train are enhanced, and different characteristics are smeared along with the suppression of noises. A delay loop with shorter length l will do more on enhancements and suppressions. In a preferred embodiment, a shorter length l is selected to increase the enhancements. As those of ordinary skill in the art should further appreciate, all segments need not be weighted equally. One may weight heavily on the statistical more significant segments or discard the statistical less significant segments.

As those of ordinary skill in the art should readily appreciate, the code correlator in a GPS processor functions as a filter, which only passes the selected navigation RF signals from a specific satellite and suppresses those from others. An aggregator stresses common, but suppresses different characteristics of a signal train from the code correlator. As those of ordinary skill in the art should readily appreciate, the aggregation process is coherent. The aggregator suppresses the signals, whose signal trains can not satisfy the loop selection equation, and enhances that do. Hence the aggregator is able to bring specific coherent navigation RF signals from incoherence. If the selections by the correlator are imperfect or the selection code incomplete, then the aggregator with its unique abilities is able to compensate for the deficiencies. Thus, through an aggregator, we will be able to bring out an signal of interest from the pseudo random noises with a partial set of codes. It is an important discovery. The aggregator has advanced the technology of spread spectrum correlator. As those of ordinary skill in the art should further appreciate, aggregators have many applications in unscrambling the spread spectrum signals and in countering the low probability interception countermeasure. Furthermore, in RF frequency filtering and time averaging, the qualities of aggregators are exceeded the corresponding devices in use. The outputs of an aggregator may be processed by any RF receivers. The aggregators are expected to appear in many applications on RF signal processing.

As those of ordinary skill in the art should readily appreciate, spread spectrum signals may be pseudo continuous or pulsed frequency hopping signals. The RF signal train needs not be continuous. The aggregator can aggregate a train of pulsed RF signals into a single pulsed RF signal, and will suppress the pulse to pulse variations of the RF signal train. It may happen in some cases, the statistical quality of a single transient pulse is poor and we may need more pulses to enhance the statistics. An aggregator provides such a mechanism, although some transient features may evaporate in aggregation. As those of ordinary skill in the art should readily appreciate, the aggregator has advanced the arts of interferoceivers, radars, and RF networks in handling weak transient signals.

Figure 10:
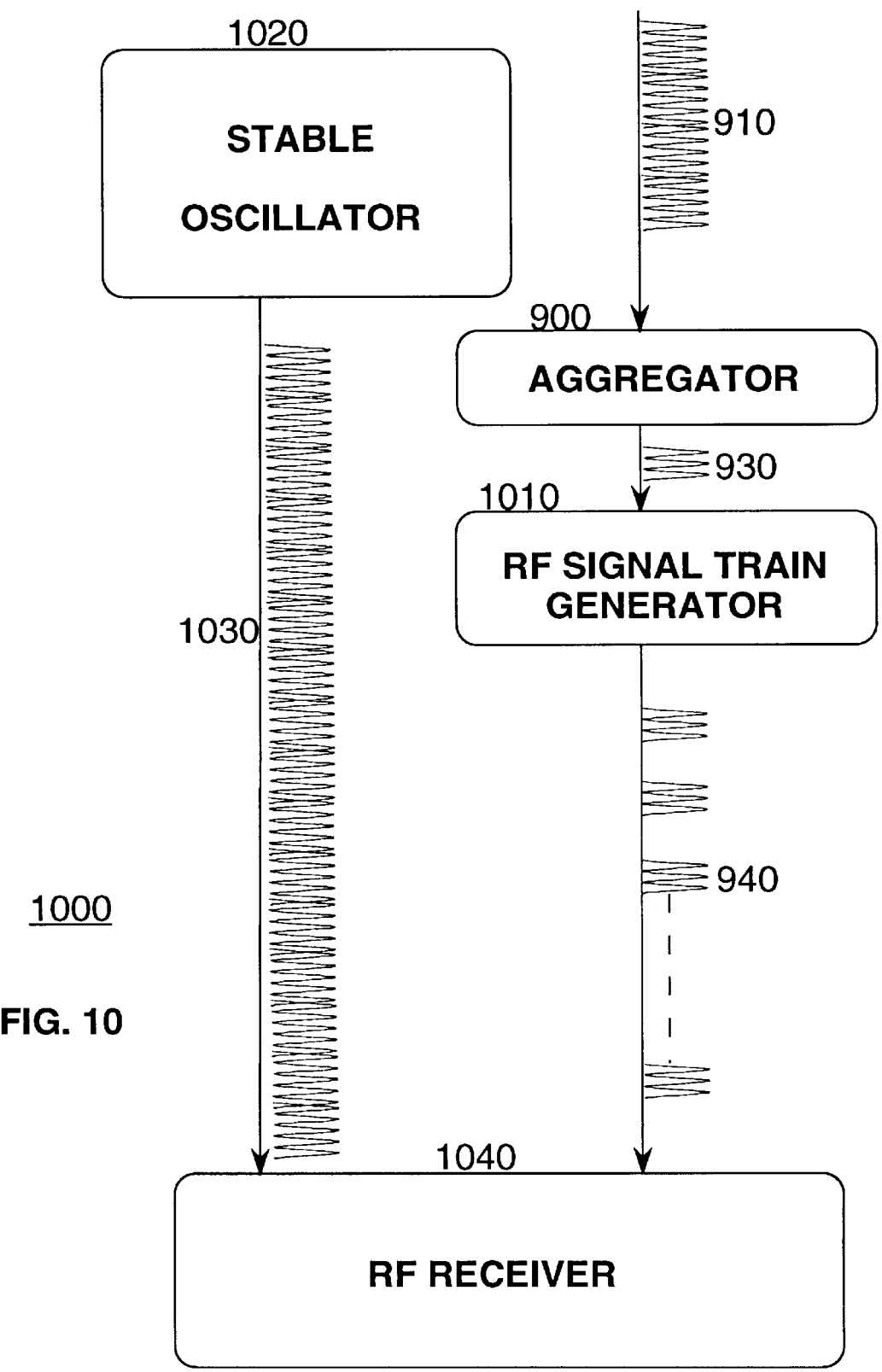
FIG. 10 shows a block diagram of an interferoceiver, which processes the aggregated RF signal with a reference to the carrier signal generated by a stable oscillator, fabricated in accordance with an embodiment of the present invention.

FIG. 10 shows a block diagram of an interferoceiver 1000 fabricated in accordance with an embodiment of the present invention. Interferoceiver 1000 processes the aggregated RF signal with a reference to the carrier signal generated by a stable oscillator. As shown in FIG. 10, the interferoceiver 1000 is comprised of RF signal train generator 1010, stable oscillator 1020, and RF receiver 1040. RF signal train generator 1010 receives the aggregated RF pulse 930 from aggregator 900 regenerated its replicas 940, and sends replicas 940 to RF receiver 1040. Stable oscillator 1020 generates continuous signal 1030 and sends signal 1030 to RF receiver 1040. RF receiver 1040 then processes replicas 940 with a reference to the continuous signal 1030 from stable oscillator 1020.

The storage mechanism, which is described in the cross related applications, for RF signal train generator 940 is an RF delay loop. As the stored pulse circles along the RF delay loop, replicas are regenerated. These replicas are identical to the stored pulse and provide us with opportunities to exam the stored pulse over and over again. Anyone with ordinary skill in the art should readily appreciate that the stored pulse is transient in nature. A transient RF pulse contains enormous information. Analog or digital recording devices can not faithfully record a transient RF pulse. The recordings of these devices are often performed at intermediate frequency (IF) stage. A down conversion from RF to IF discards major critical information contained within the transient pulse. Digitizing samplers are not fast and accurate enough to capture all intrinsic features of a single transient pulse at RF level. We were not able to completely decipher a short transient pulse before the inventions of RF signal train generators and interferoceivers. For instance, it was totally impossible to decipher 1 Hz Doppler shift from a 10 GHz RF pulse with 1.0 nanosecond pulse width. The opportunities to reexamine a short transient pulse clear away the impossibilities. RF signal train generators and interferoceivers open a new era in investigating transient phenomena.

It is well known to those of ordinary skill in the art that conventional GPS processors are too slow to handle the rapid variations and inertial measurement units (IMS) have to be introduced in supplementing globe positioning system (GPS) signals on the dynamical navigations. As those of ordinary skill in the art would appreciate, the abilities of an interferoceiver in handling the aggregated navigation RF signals eliminate the deficiencies of GPS processors and the needs of IMS. As those of ordinary skill in the art would further appreciate, the embodiments of the present invention not only eliminate the deficiencies of GPS processors, but also provide mechanisms to handle the transient effects contained within continuous signals and to enhance the statistics of weak transient signals.

As those of ordinary skill in the art should readily appreciate, GPS signals are pseudo random signals, which are not designed to handle transient features. The present invention overcomes such limitation. The ability in handling the transient features depends on the shortest time interval to single out the GPS signals from a specific GPS satellite while excluding others. Aggregators will decrease the above time interval and increase the ability of GPS of handling transient features. When the needs arise, instead of GPS signals, one may use an independent RF support network to provide special navigation RF signals for enhancing the capabilities of handling the transient features.

As those of ordinary skill in the art should readily appreciate, stable oscillator 1020 may be tunable to match with the main Doppler shift of the carrier frequency from the motions of satellites or platforms. In a preferred embodiment, stable oscillator 1020 shares with the code-tracking loop of the conventional GPS processor to simplify the circuit design.

ADVANTAGES AND OBJECTIVES

Embodiments of the present invention are advantageous, because the embodiments provide real time and online state vectors to radars, sonars, phase arrays, sensors, cameras, platforms, extended objects, and so on. The information gathering systems depend on the state vectors for their operations, and need these vectors to achieve their optimum performance. The state vectors lead to precise attitude determinations. A precise attitude is very import to assure the performance of systems onboard a platform. Furthermore, the state vectors furnish precise descriptions on the dynamical characteristics of structured objects, and will ensure the safety of ships, aircraft, buildings, bridges, etc. As those of ordinary skill in the art should readily appreciate, embodiments of the present inventions are advantageous are capable of providing any physical systems with real time and online state vectors.

Embodiments of the present invention are advantageous, because the descriptors are simple to be integrated with their hosts. For optical RF networks, RF stereo and radar systems, their descriptors can be simply constructed. Since optical RF link systems already exist, we only need to add navigation antennas and processes. Descriptors have many applications. The present teaching only discusses few of them. It is straightforward to bring a descriptor into the microcells, since optical fibers have been widely used to setup microcells for cellular phones. The descriptor will provide state vectors to track the phase centers of microcell antennas. With a help of RF stereo, the cellular network will then have added capabilities in locating the exact positions of their users and in pinpointing the areas where the service is poor. Furthermore, microcell antennas can be paired up to function as profiled phase arrays.

Embodiments of the present invention are advantageous, because the navigation RF signals are widely available. The embodiments can be implemented anywhere. Attitude of a movable platform is an important parameter to enhance the performance of its onboard information gathering systems. Attitude determination often relies on natural markers, which are not always available and sometimes unreliable. IMS is often used to fill the gap. System drifting degrades IMS liabilities. As those of ordinary skill in the art can readily appreciate, the embodiments of the present invention overcome the above deficiencies.

Embodiments of the present invention are advantageous, because the embodiments remove many obstacles in RF networks, RF stereo and radar systems. These obstacles are more severe for the networks and systems on movable platforms. With precise and timely knowledge on the state vectors provided by the descriptors, their performances become more sophisticated. Furthermore, their integrities can be vigorously maintained, and any deviations calibrated in real time. Optical fiber based bistatic radars become capable of mapping three dimensional synthetic radar images. Optical RF stereo systems on movable platforms become definitive in passive Doppler and range measurements.

Embodiments of the present invention are advantageous, because the embodiments eliminate the rigidity requirements on the phase arrays. The technical barrier no longer exists on the space deployment of phase arrays. These arrays, due to their pinpointing abilities of RF emitters, have many military and civilian uses. Many well known methods, with the help of descriptors, can be used from the space based phase arrays to track aircraft and missile on flight, or any other airborne objects. As more and more orbited debris increases, tracking the debris becomes important and the need for space based arrays will arise.

Embodiments of the present invention are advantageous, because the embodiments assure the integrities of profiled phase arrays. It becomes possible to conceal the profiled phase arrays for covert operations and to deploy them in accordance with the contours. Furthermore phase arrays with large dimension become portable. With array elements on different trucks, a profiled phase array can be moved to any location. Embodiments of the present invention will provide the profiled phase array the proper state vectors at the new location after the setup, and will assure the integrity during its operations.

Embodiments of the present invention are advantageous, because the embodiments are able to monitor the integrities of extended objects. Conventional GPS methods do not possess such capabilities. As the extended objects, such as bridges and tower, age and deteriorate, their mechanical characteristics will change. Monitoring these changes will provide solid information on the states of these extended objects. As those of ordinary skill in the art can appreciate, the present invention will be able to perform the function of monitoring.

Embodiments of the present invention are advantageous because the embodiments remove the dependence on metal cables for measuring the movements of structured objects. A living body, with many degrees of dimensional freedom, would not have to carry many metal cables on its motion measurements. Fiber optics, micro strip, and RF technologies evolve rapidly. As those of ordinary skill in the art should readily appreciate, the present invention will be able to meet the needs on the precision measurements of the hand and finger movements, and of the motions caused by breath and hart beats.

Embodiments of the present invention are advantageous, because the embodiments overcome the deficiencies of conventional GPS processors. The host of a conventional GPS processor needs not be stationary or in uniform motions. An aggregator of the present invention will identify rapid motion variations of the host and eliminate their effects on GPS processors. The identification of motion variations has many applications. One of them is aircraft inspections. As an aircraft ages, metal fatigue is a major cause of mechanical failures. The method in fatigue evaluation is mostly static. It is tedious and time consuming. The aircraft must be taken out from service. Metal fatigue changes the dynamical vibrations of an aircraft in flight. The embodiments of the present invention can be used to measure aircraft dynamical changes and to identify mechanical fault of an aircraft during flight. Inspections become greatly simplified.

Embodiments of the present inventions are advantageous, because the embodiments have coherent enhancement mechanisms, which can bring out signals of interest from the pseudo random noises with a partial set of codes. As those of ordinary skill in the art can appreciate, the enhancement mechanisms change the technology base on spread spectrum intelligence. Pseudo random noise codes become easier to crack. On the other hand, enhancement mechanisms reduce the necessities of message repetitions. A reduction in repetitions will increase the message protections. Furthermore, pseudo random signals are used in space communications. The embodiments of the present invention will lead to a reduction in the repetitions of pseudo random signals, thus increase the rate of space communications.

Embodiments of the present inventions are advantageous, because the embodiments advance the generic architectures of RF and acoustical systems. The architectures will lead to more adoptions of the commercial off the shelf technologies, and will shorten time gaps to insert new technologies into the fielded systems. Furthermore, the generic architectures will lead to the elimination of system proliferations and of functional specific systems proliferations. The traditional system divisions will disappear, and new systems will have more functional capabilities.

SUMMARY, RAMIFICATIONS, AND SCOPE

Those skilled in the art recognize that further embodiments of the present invention may be made without departing from its teachings. For example, the descriptor and aggregator can have many designs as well as variations. As the technology evolves, they may utilize new and advanced methods to process their signals. The formats of navigation RF signals may change to secure the military needs, to reduce the redundant repetitions, to enhance the abilities in handling dynamical situations of rapid changes, or to serve civilian interests. A state vector may describe any intrinsic signatures, internal motions, arrangements of a structured objects. RF delay loops may take different forms, and can be surface acoustical devices. Descriptors and aggregators may have many more applications than discussed. Thus the scope of the invention should be determined by appended claims and their legal equivalent, rather than by the examples given.

What is claimed is:

1. A descriptor comprising:

a processing center;

an antenna network comprised of two or more antenna subsystems;

a processor network comprised of one or more processors located at the processing center;

an RF link network comprised of at least one optical RF link system;

wherein each of said antenna subsystems comprises one or more navigation antennas;

wherein the navigation antennas receive navigation RF signals;

wherein the RF link network transits the navigation RF signals from the antenna network to the processor network;

wherein the processor network analyzes the navigation RF signals to measure at least one relative position of antenna subsystems or navigation antennas, and one or more configuration vectors of the antenna network.

2. The descriptor of claim 1 wherein the processor network includes a code correlator, responsive to the received navigation RF signals, to generate one or more RF signal trains; and an aggregator, responsive to an RF signal train generated by the code correlator, to generate an pulsed RF signal.

3. The descriptor of claim 2 wherein the processor network further includes an RF signal train generator, responsive to the pulsed RF signal, to regenerate replicas of the pulsed RF signal.

4. The descriptor of claim 1 wherein said navigation antennas are adapted to receive navigation RF signals from moving or stationary platforms.

5. The descriptor of claim 1 wherein:

(a) the antenna network is integrated with a physical system comprised of one or more physical antennas;

(b) the one or more antenna subsystems of the antenna network, responsive to integration, establishes mechanical relationships with the one or more physical antennas of the physical system;

(c) the descriptor further comprises an integration processor;

(d) the integration processor, responsive to the mechanical relationships, translates the one or more configuration vectors to one or more state vectors in describing the physical system.

6. The descriptor of claim 1 wherein:

(a) the antenna network is integrated with a structured object;

(b) the one or more antenna subsystems of the antenna network, responsive to integration, establish mechanical relationships with the structured object;

(c) the descriptor further comprises an integration processor;

(d) the integration processor, responsive to the mechanical relationships, translates the one or more configuration vectors to one or more state vectors in describing the structured object.

7. A method for operating a descriptor comprising the steps of:

(a) receiving navigation RF signals by navigations antennas in antenna subsystems of an antenna network;

(b) linking the antenna network with a processor network located at a processing center;

(c) transiting the navigation RF signals from the antenna network to the processor network through at least one optical RF link system;

(d) analyzing the navigation RF signals by the processor network to measure at least one relative position of navigation antennas, and one or more configuration vectors of the antenna network.

8. The method of claim 7 further comprising steps of:

(e) sending the received navigation RF signals to a code correlator;

(f) generating one or more RF signal trains by the code correlator;

(g) sending an RF signal train generated from the code correlator to an aggregator;

(h) generating a pulsed RF signal by the aggregator;

(i) processing the pulsed RF signal.

9. The method of claim 8 further comprising steps of:

(j) sending the pulsed RF signal to an RF signal train generator;

(k) regenerating replicas of the pulsed RF signal by the RF signal train generator;

(l) processing the regenerated replicas.

10. The method of claim 7 further comprising steps of:

(e) adapting the navigation antennas to receive navigation RF signals from moving or stationary platforms.

11. The method of claim 7 further comprising steps of:

(e) integrating the antenna network with a physical system comprised of one or more physical antennas;

(f) establishing mechanical relationships between the one or more antenna subsystems of the antenna network and the one or more physical antennas of the physical system;

(g) translating the one or more configuration vectors, responsive to the mechanical relationships, to one or more state vectors in describing the physical system.

12. The method of claim 7 further comprising steps of:

(e) integrating the antenna network with a structured object;

(f) establish mechanical relationships with the structured object with the one or more antenna subsystems of the antenna network;

(g) translating the one or more configuration vectors, responsive to the mechanical relationships, to one or more state vectors in describing the structured object.

13. A mechanism for describing a physical system comprising:

a processing center;

an antenna network comprised of antenna subsystems;

an RF link network comprised of at least one optical RF link system;

(a) wherein each of said antenna subsystems comprises one or more navigation antennas.;

(b) wherein the antenna network is integrated with the physical system to establish mechanical relationships between the navigation antennas and said physical system;

(c) wherein the RF link network transits navigation RF signals received by the antenna network to the processor center;
(d) wherein the processor center analyzes the navigation RF signals received by the antenna network to measure at least one relative position of navigation antennas, and one or more configuration vectors of the antenna network;
(e) wherein the processing center, through the mechanical relationship; translate the configuration vectors to one or more state vectors in describing the physical system.

14. The mechanism of claim 13 wherein the processing center uses a kinematic differential method to process the navigation signals.

15. The mechanism of claim 13 wherein the processing center comprises a stable oscillator; wherein the processing center uses the stable oscillator to process received navigation RF signals from the antenna network.

16. The mechanism of claim 13 wherein the processing center comprises a aggregator to process the navigation RF signals.

17. The mechanism of claim 13 wherein the processing center comprises an interferoceiver to process the navigation RF signals.

18. The mechanism of claim 13 wherein the processing center comprises an optical fiber delay loop to process the navigation RF signals.

19. The mechanism of claim 13 further comprises an apparatus to monitor or survey the integrity of the physical system.

20. The mechanism of claim 13 wherein said physical system is airborne, ground based or submerged, and is rigid or fixable.

* * * * *

UNITED STATES PATENT AND TRADEMARK OFFICE
CERTIFICATE OF CORRECTION

PATENT : 5,955,989
DATED : September 21, 1999
INVENTOR(S) : Ming-Chiang Lli

It is certified that error appears in the above-identified patent and that said Letters Patent is hereby corrected as shown below:

Column 1, line 46, "parent inventions" should read --inventions--.

Column 14, line 21, "parent inventions" should read --cross related inventions--

Signed and Sealed this

Eighth Day of February, 2000

Q. TODD DICKINSON

*Attest:*

*Attesting Officer*   *Commissioner of Patents and Trademarks*

UNITED STATES PATENT AND TRADEMARK OFFICE
CERTIFICATE OF CORRECTION

PATENT NO. : 5,955,989
DATED : September 21, 1999
INVENTOR(S) : Ming-Chiang Li

It is certified that error appears in the above-identified patent and that said Letters Patent is hereby corrected as shown below:

Title page, item [54] and col. 1, change the title to read as follows:
--RF Descriptor and Aggregator--.

Signed and Sealed this

Eleventh Day of April, 2000

Attest:

Q. TODD DICKINSON

Attesting Officer

Director of Patents and Trademarks